United States Patent

Inoue et al.

[11] 3,713,729
[45] Jan. 30, 1973

[54] PROCESS FOR PRODUCTION OF OPTICAL FIBER BUNDLES

[75] Inventors: Touru Inoue, Nishinomiya-shi; Seizo Noguchi, Itami; Kunihiko Mukai, Tsu, all of Japan

[73] Assignees: Nippon Sheet Glass Co., Ltd.; Nippon Glass Fiber Co., Ltd., Mie-ken, Japan

[22] Filed: Aug. 3, 1971

[21] Appl. No.: 168,560

[52] U.S. Cl. ............. 350/320, 8/158, 19/65 T, 29/419, 29/424, 29/DIG. 46, 68/3 SS
[51] Int. Cl. ............................................. G02b
[58] Field of Search ......................... 29/411, 419 G, 419, 424, DIG. 46; 8/158; 19/65 T, 66 T, 66 R; 68/3 SS; 156/73; 350/320

[56] References Cited

UNITED STATES PATENTS

| | | | |
|---|---|---|---|
| 2,311,704 | 2/1943 | Simison | 29/411 |
| 2,433,271 | 12/1947 | Grant | 29/411 |
| 2,992,956 | 7/1961 | Bazinet | 156/73 |
| 3,228,067 | 1/1966 | Strang et al. | 19/66 R |

FOREIGN PATENTS OR APPLICATIONS

| | | | |
|---|---|---|---|
| 1,112,578 | 5/1968 | Great Britain | 19/65 T |
| 1,207,814 | 10/1970 | Great Britain | 350/320 |

*Primary Examiner*—Richard J. Herbst
*Assistant Examiner*—Donald C. Reiley, III
*Attorney*—E. F. Wenderoth et al.

[57] ABSTRACT

A process for producing a bundle of optical fibers aligned in a highly parallel and compact state, which comprises tying a bundle of a number of optical fibers at a small portion in the vicinity of its one end, holding the tied portion and suspending the non-tied substantial portion of the bundle vertically with said substantial portion being exposed to air, applying a liquid pressure to the tied end portion of said bundle to allow liquid to flow through the interspaces among the individual fibers from the tied end to the free end of the bundle, and imparting a mechanical vibration to the fiber bundle simultaneously with the application of the liquid pressure, and an apparatus for performing said process.

5 Claims, 5 Drawing Figures

TOURU INOUE,
SEIZO NOGUCHI and
KUNIHIKO MUKAI,
INVENTORS

PROCESS FOR PRODUCTION OF OPTICAL FIBER BUNDLES

This invention relates to a process and an apparatus for producing a bundle of image-transmitting optical fibers, and more specifically to a process and an apparatus for producing a bundle of a number of slender optical fibers which are regularly and compactly aligned in a parallel relationship to one another.

As is well known, each individual optical fiber is composed of a core of light conducting material having a high refractive index and a cladding structure covering said core and composed of a transparent material having a lower refractive index. In order that a bundle of a number of these optical fibers may transmit the image faithfully, it is necessary that the individual optical fibers which constitute the bundle should be aligned compactly in parallel to one another to the greatest possible extent.

Various methods have been proposed previously to align such elongated fibers regularly and in a parallel relationship to one another. For example, U.S. Pat. No. 1,048,855 discloses a method wherein two meshes of the same structure having a number of small holes are used, and a number of fibers passed through these holes are maintained in a parallel relationship to one another. U.S. Pat. No. 2,992,956 discloses a method wherein a number of fibers are placed horizontally in loose state in a receptacle having a width shorter than the lengths of the fibers, and the receptacle is subjected to a vibratory motion in the transverse direction thereby to align the fibers in parallel to one another.

By any of these methods, however, with elongated ultrafine fibers having much smaller diameters than their lengths, for example with a diameter of less than 100 microns and a length of above 100 mm, it is impossible to make a bundle of such fibers aligned in a parallel relationship with one another because of the flexibility of the fibers themselves. In an attempt to align fibers having much smaller diameters than their lengths compactly in a parallel relationship with one another, U.S. Pat. No. 2,311,704 discloses a method comprising imersing a bundle of a number of elongated fibers in a liquid thereafter withdrawing the bundle vertically, and squeezing the liquid contained in the bundle from one end thereof.

With a bundle of light fibers for use in an image-transmitting device, a very high degree of parallel alignment of the individual fibers is required in order to transmit an image in contract with one end face of the fiber bundle accurately to the other end face without distortion. Hence, by merely immersing a fiber bundle in a liquid, withdrawing it, and squeezing off the liquid from the bundle, it is totally impossible to obtain a high degree of parallel alignment.

British Pat. 1,207,814 discloses a process which comprises holding fibers in a bundle together at its one end, immersing the fiber bundle in a wetting liquid, withdrawing the bundle lengthwise from the liquid through a diaphragm to align the fibers, and imparting vibration to the bundle immersed in the liquid. However, such a process still cannot achieve a high degree of parallel alignment of individual optical fibers in a compact state sufficient to transmit an image without distortion.

The present invention provides a new process and apparatus for achieving compact and completely parallel alignment of fibers required for image-transmission purposes in a fiber bundle composed of a number of optical fibers having much smaller diameters than their lengths.

According to the present invention, there is provided a process for producing a bundle of optical fibers aligned in a highly parallel and compact state, which comprises tying a bundle of a number of optical fibers at a small portion in the vicinity of its one end, holding the tied portion and suspending the non-tied substantial portion of the bundle vertically with said substantial portion being exposed to air, applying a liquid pressure to the tied end portion of said bundle to allow liquid to flow through the interspaces among the individual fibers from the tied end to the free end of the bundle, and imparting a mechanical vibration to the fiber bundle simultaneously with the application of the liquid pressure.

The present invention also provides an apparatus for aligning the individual fibers of a bundle of optical fibers compactly and in parallel to one another, said apparatus comprising a wall element for defining a closed space, holding means connected to said wall element for holding the outer peripheral portion of the upper end of the fiber bundle and suspending the unheld substantial portion of the bundle in the vertical direction, said holding means including an opening for exposure of the upper end face of bundle, said wall element, said holding means, and the end face of the fiber bundle exposed from the opening together forming the closed space, means for introducing pressure liquid, said means being connected to said wall element and introducing liquid into the closed space whereby the liquid passes from the exposed end face through the interspaces among the individual optical fibers, and vibrating means for imparting vibration to said fiber bundle during the flowing of the liquid.

The process of the present invention will be described in greater detail below.

According to the present invention, a number of slender glass or synthetic resin fibers having a diameter of less than 100 microns and a length of more than 100 mm are bundled, and one end of the bundle is tied. The tied portion is held, and the remainder of the fiber bundle is suspended in air downwards. Liquid pressure is applied to the one end face of the tied fiber bundle, and liquid is caused to flow down. Then, the entanglement of the fibers is gradually removed, and the individual fibers gradually move along the flow of the liquid. The fibers will thus be aligned in parallel to one another while the alignment of the bound portion of the fiber bundle is maintained as it is. At this time, mere flowing of liquid causes deviated flows of the liquid through the interspaces among the fiber bundle, since the liquid tends to flow through those paths which permit relatively easy flow of the liquid. This results in some disorder in the alignment of the individual fibers, and it is difficult to obtain complete parallel alignment. In order to remove such a defect, vibration is imparted to the fibers at the same time as the application of liquid pressure, for example by imparting vibration of a relatively short cycle using a vibrator, or imparting rocking movement of a relatively long cycle by causing the reciprocal movement of the fiber bundle. In the present specification and claims, these vibration and rocking movement will be generically termed simply "vibration." By the action of vibration, liquid flowing from the end face passes uniformly through the interspaces among the fibers, and the liquid flow is not deviated at all. The parallel alignment of the fibers is remarkably improved as compared with the case of merely flowing liquid through the interspaces.

Another very essential feature of the present invention is that at the time of imparting vibration to the fiber bundle, a substantially entire length of the fiber bundle should be suspended in air. If vibration is imparted to the fiber bundle immersed in the liquid and the liquid is caused to flow in this state, the individual fibers show a tendency of spreading towards the peripheral direction from the central axis of the fiber bundle because in the liquid, they undergo buoyancy or other influences. It is therefore difficult for the individual fibers to take a compact and highly parallel alignment. On the other hand, if a greater portion of the fiber bundle is suspended in air as in the process of the present invention, and the flowing of liquid and the imparting of vibration are effected concurrently, the individual fibers tend to gather compactly towards the central axis of the fiber bundle by the action of the surface tension of the liquid. At the same time, the flowing of liquid and the imparting of vibration are effected simultaneously, and therefore, the individual fibers can be aligned compactly and in a high degree of parallelism.

Desirable effects obtained by mechanical vibration of the fiber bundle in the process of the invention are probably attributable to the following reasons. It is assumed that when a mechanical vibration is imparted to the fiber bundle, small spaces are formed among the fibers which are entangled or are in contact with one another without parallel alignment, and the liquid passes through these spaces also; and therefore that the flow of liquid becomes uniform and parallel alignment can be promoted. Or it is assumed that relative slippage occurs by the action of vibration, and reduces the adhering power of frictional power among the fibers, and consequently, the alignment of the fibers along the liquid flow is promoted. The mechanical vibration may be applied to any part of the fiber bundle so long as it is to an extent such as to cause relative slippage among the fibers or form spaces among them. But when applied to the tied portion of the bundle, vibration can be efficiently transmitted to the inside of the fiber bundle, and accordingly the best effects are obtained.

The preferred pressure of the liquid to be applied to the fiber bundle in the present invention is 0.5 kg/cm² to 5 kg/cm². In order to disentangle the fibers and align the fibers in a parallel relationship with each other in a short period of time, it is necessary to apply a liquid pressure of at least 0.5 kg/cm² to the upper end face of the fibers at least in a part of the process step. If the pressure is too large, the individual fibers may drop off from the tied portion of the fiber bundle. Therefore, pressure above 5 kg/cm² are not preferred.

This pressure is a relative pressure, that is, the difference between the pressure of the liquid at one end face of the fiber bundle and the pressure of the atmosgere on the out-flow side of the fiber bundle. Hence, the process of the present application can also be performed by adjusting the pressure of liquid at one end face of the bundle approximately to normal atmospheric pressure and maintaining said atmosphere at a pressure lower than normal atmospheric pressure whereby a liquid pressure corresponding to the difference between normal atmospheric pressure and the pressure of the atmosphere can be applied to said one end face of the fiber bundle.

Water is usually used as the liquid in the present invention. If the fibers are made of glass of the composition which is readily attacked by water, organic solvents, such as alcohol, benzene, acetone, kerosene, or cyclohexane can also be used. It is assumed that when the liquid flows among the fibers, the fibers undergo viscosity resistance of flowing liquid and thus are aligned parallel to one another. It is therefore preferred that the liquid should be readily wetted, and that the viscosity of the liquid should be somewhat large. Addition of anionic or nonionic surface active agents, polyvinyl alcohol, or ethylene glycol to the liquid leads to an increase in said wetting and/or viscosity, and therefore, it is possible to enhance the aligning effect of the fibers by a stream of the liquid.

The process of the present invention is convenient for obtaining parallel alignment of fibers when applied to a bundle of fibers having much smaller diameters than their lengths. It is especially effective for application to a fiber bundle composed of more than several ten thousand elongated fibers having a diameter of less than 100 microns and a length of more than 100 mm. The size of the fiber bundle can be varied according to the desired purpose. When the process of the present invention is applied to fibers having a diameter of 10 microns to several hundred microns, good results are obtained if the size of a bundle of these fibers is such that it has a diameter of from 10 mm to 100 mm and a length of from 200 mm to 1000 mm.

The larger the liquid pressure and the vibration energy, the shorter the time needed for disentangling the fibers. But in order for the disentangled fibers to be aligned in parallel to one another, the pressure and the energy should not be too large. It is preferred that at an initial stage of the process, the liquid pressure and the vibration energy should be maintained relatively large, and with the passage of time, they should be gradually reduced.

Some of the fibers constituting the fiber bundle whose one end is tied are broken at intermediate points along the lengths of the fibers. Of the broken fibers, those portion not tied are difficult to pull out of the fiber bundle by the action of liquid pressure alone. But by applying vibration simultaneously with the application of the liquid pressure. these broken fibers can be very easily pulled out of the fiber bundle. Even after this treatment, the remaining portions of the broken fibers still remain bound to the tied portion of the fiber bundle. Usually, the other end of the bundle not originally bonded is tied, and the originally bound portion is untied. Then, liquid pressure and vibration are again applied to the other end of the bundle newly tied, whereby the remaining portions of the broken fibers can be removed and the fibers are aligned in parallel to one another.

The present invention will be described with reference to the accompanying drawings in which.

Figure 4:
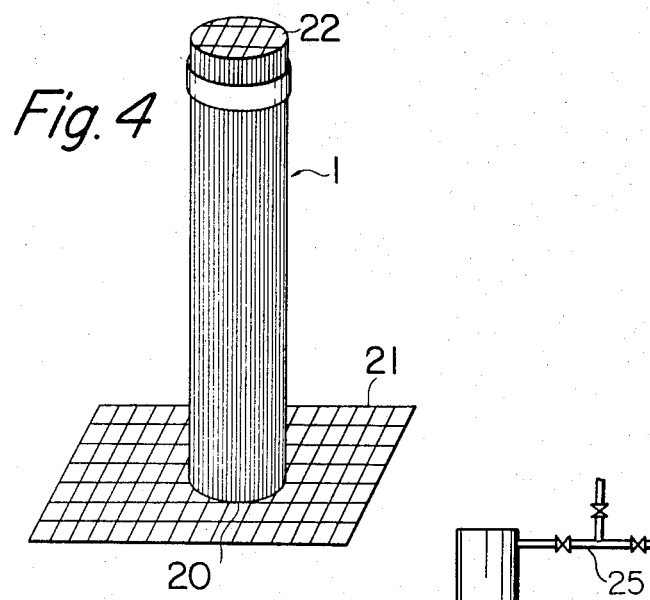
Figure 5:
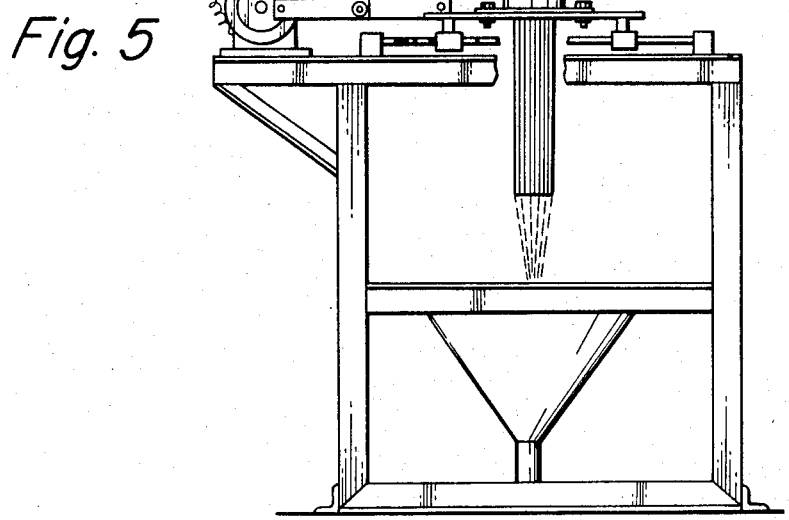

FIG. 4 is a perspective view of a fiber bundle in which the constituent fibers are regularly aligned in parallel to one another by the application of the process of the present invention, and the pattern in contact with one end face of the fiber bundle is reflected on the other end face without distortion; and FIG. 5 is a schematic view of an apparatus for practising another embodiment of the process of the present invention.

Figure 1:
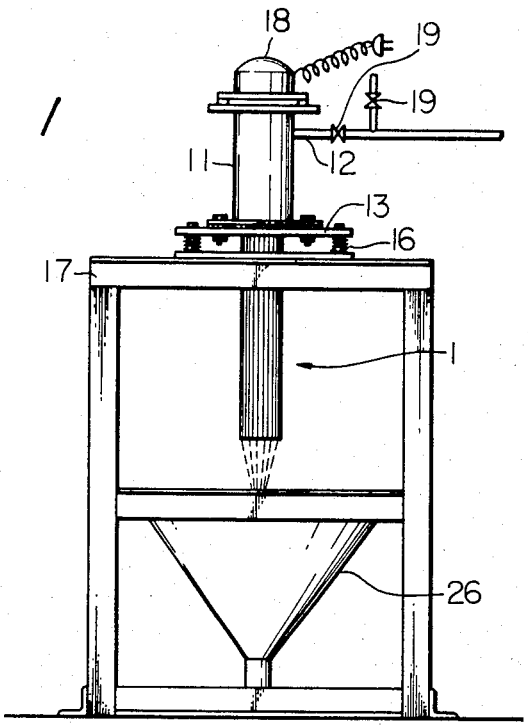
FIG. 1 is a schematic view of an apparatus for practising one embodiment of the process of the present invention.
Figure 2:
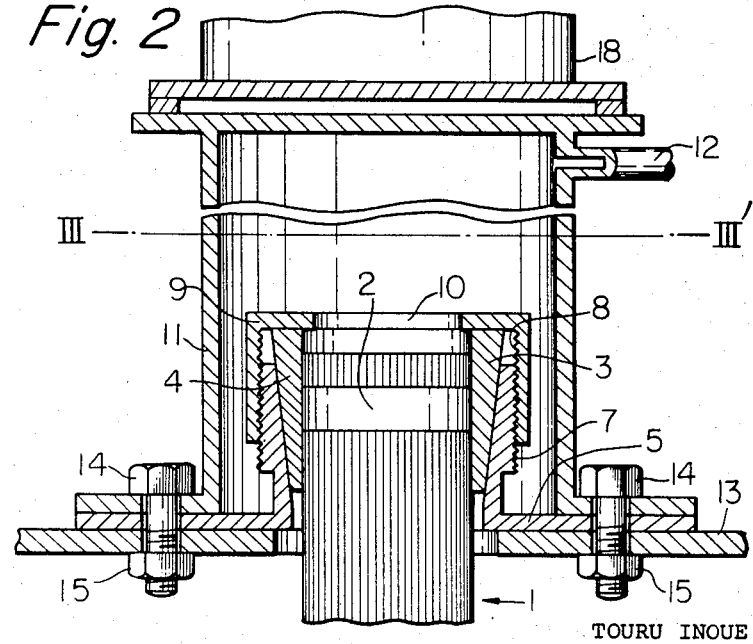
FIG. 2 is a sectional enlarged view of a part of FIG. 1.
Figure 3:
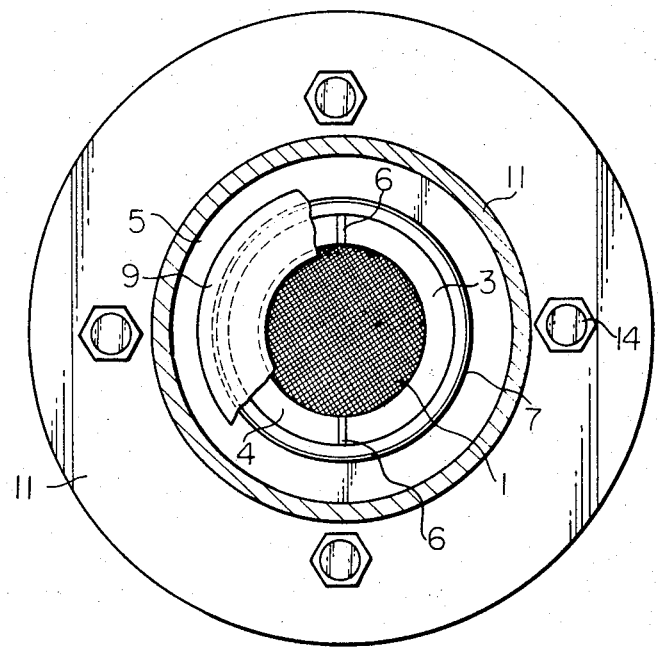
FIG. 3 is a plan, partly broken away, of FIG. 2 taken along the line III — III'.

Referring to FIGS. 1 to 3, a fiber bundle is shown at 1 which is composed of several ten thousand light transmitting fibers having a diameter of about 30 microns and a length of about 500 mm. One end of the fiber bundle 1 is tied with a tape 2 such as Teflon tape. The tied end portion of the fiber bundle is held by holders 3 and 4, and the fiber bundle is mounted on a flange 5 at the lower flow outlet of a liquid tank. Each of the holders 3 and 4 has an outer circumferential shape resembling a tapered cylinder divided into two. The flange 5 has a taper in its inner circumference for fitting the holders therein. One end of the fiber bundle is held by the holders 3 and 4, and inserted in the flange. There is some spacing between the holders, and a packing 6 is filled in this spacing. A male screw 7 is cut in the outer circumference of the flange, and a cover 9 having a female screw 8 cut in its inner circumference is screwed into the flange, whereby one end of the fiber bundle and the holders are pushed downwards. In FIG. 3, the cover 9 is shown in a partly broken away form. An opening 10 having a diameter substantially equal to the diameter of the fiber bundle is provided at the center of the cover 9, and liquid pressure acts on one end of the fiber bundle through this opening. By clamping the cover 9 moderately to push down the holders 3 and 4, the spacing between the holders is reduced, and the inner diameter formed by the holders and the diameter of the fiber bundle are reduced. Thus, the one end of the fiber bundle is pushed and pressed by the holders, and the compactness of the fiber bundle increases. If the clamping of the cover 9 is too weak, whole or part of fiber bundle comes off from the tie when liquid pressure is applied. If the clamping is too strong, it becomes difficult to pass liquid among the fibers, and a parallel alignment cannot be obtained. Hence, the clamping should be made moderately.

In the above-mentioned embodiment, the tying of one end of the fiber bundle is effected by first binding one end of the bundle with a tape, and then firmly holding that portion with holders 3 and 4. In the process of the invention, however, tying of the fiber bundle with a tape is not altogether necessary, and it is possible to hold one end of the bundle with hand and then hold that portion directly with holders 3 and 4. Hence, by the term "tying," used in the specification and claims of the present application, is meant that the individual optical fibers are held so that they form a bundle of closely gathered fibers.

On the periphery of the flange 5 is located the upper portion 11 of the liquid tank. A liquid supply duct 12 is secured to the upper part of the upper portion 11 of the liquid tank which is farthest from the upper end of the fiber bundle, so that uniform liquid pressure will be applied to said one end. The upper portion 11 of the liquid tank and the flange 5 are fixed to each other together with a support plate 13 by means of bolts 14 and nuts 15.

The support plate 13 is supported by a frame 17 through a spring 16. Therefore, vibration generated from a vibrator 18 provided at the upper portion of the tank is not absorbed by the frame 17, but is transmitted to the fiber bundle past the liquid tank. The substantial portion (untied portion) of the fiber bundle is suspended in a vertical direction while being exposed to air.

The liquid tank passes water from a pump (not shown) to the upper end face of the fiber bundle 1 while adjusting the water pressure to be exerted on the upper end face of the fiber bundle by a control valve 19 which controls the amount of water to be caused to flow down. The electric magnetic vibrator 18 secured to the upper portion 11 of the liquid tank imparts mechanical vibration having a basic number of vibration of 120 cycles/sec, equal to two times the number of vibration of impressed voltage to the fiber bundle through the wall of the tank, etc. during the passage of flowing water through the fiber bundle by applying an alternate current voltage having a number of vibration of 60 cycles/sec. By varying the voltage to be applied to the vibrator, it is possible to control the amplitude of vibration generated and the intensity of vibration to be applied to the fiber bundle. When the maximum voltage, that is 100 volts, is applied to the vibrator, the neighborhood of the lower portion of the tank vibrates up and down with an amplitude of about 0.5 mm. When this vibration is transmitted to the fiber bundle through which water is flowing, the individual fibers of the bundle vibrate in a zig-zag fashion with an amplitude in the horizontal direction of 1 to 3 mm.

In the first step, water is caused to flow through the fiber bundle at a water pressure of about 2.5 kg/cm$^2$, and simultaneously 100 volts are applied to the vibrator, giving the vibration to the fiber bundle for about 1 hour. In the second step, the water pressure in the interior of the tank and the voltage applied to the vibrator are maintained at 0.5 kg/cm$^2$ and 50 volts, respectively for about an hour. In the third step, the pressure and the voltage are maintained at 0.1 kg/cm$^2$ and 30 volts for about one and a half hour. Finally, in the fourth step, water is caused to flow down only by the head of water in the tank, and the voltage of the vibrator is maintained at 20 volts; after a lapse of about 30 minutes, the flowing of water and imparting of vibration are stopped. Then, the lower end of the suspended fiber bundle is tied, and the bundle is turned upside down. The initially bound portion is untied, and then the above process steps are performed once again. Water which drops off from the fiber bundle into the air is removed by means of an exhaust device 26.

By these process steps, the alignment of the fibers progresses gradually. By the first step, the entanglement of the fibers with one another or very large disorder in alignment are removed, and the broken fibers are removed from the fiber bundle. The removal of the broken fibers can be readily performed by touching the fiber bundle with a rod-like structure along the bundle from the upper to lower portion during the first step. By the second step, a relatively large disorder in the alignment of the fibers is removed, and by the third step, the parallel alignment of the fibers is further advanced. Finally, by the fourth step, the fibers are compactly and parallely aligned to a high degree.

When the above process steps have been completed, the resulting fiber bundle 1 is capable of transmitting a pattern figure 21 closely in contact with the end face 20 of the bundle 1 to the other end face 22 without distortion. The individual fibers are aligned completely in parallel to one another. When the flowing of water was continued for about 10 hours without operating the vibrator at all, the resulting fiber bundle did not show complete parallel alignment as shown in FIG. 4.

While containing water among the fibers, the fiber bundle of the compactly and parallely aligned fibers is maintained at about −70° C. to freeze and cement the constituent fibers with frozen water. The cemented fiber bundle is cut in the cemented state to the desired sizes. A plurality of the cut optical fiber bundles are assembled, and heated under pressure, whereby water among the fibers is evaporated. Thereafter, by heat-fusing the fibers with one another, there can be obtained a face plate for use in cathode ray tubes.

When only the end portions of the fiber bundle consisting of fibers aligned in parallel with one another are heat-fused or cemented by a resin, an optical fiber bundle having flexibility can be obtained. This fiber bundle can be used for image-transmission devices such as fiber scopes.

Referring to FIG. 5 which shows another embodiment of the apparatus of the invention, a fiber bundle composed of fibers having a diameter of about 50 microns and a length of about 350 mm is fixed to the flow-out opening at the lower portion of a liquid tank 23, and cyclohexane is caused to flow down at a pressure of about 2 kg/cm². At the same time, by the driving of a motor 24, the liquid tank and the fiber bundle are reciprocally moved in the horizontal direction at a rate of about 30 time per minutes with a stroke of about 20 mm. The flowing of cyclohexane fed from the duct 25 is continued. Thereafter, the liquid pressure and the number of vibration per minute are gradually reduced, and in about 4 hours, the operation is stopped. As a result good parallel alignment of the fibers is obtained as in the previously disclosed embodiment of the present invention.

While the above embodiments have been described with respect to the case of vibration by a vibrator and oscillation by reciprocal movement, many other forms of imparting vibration can be used in the invention which include for example, light continuous striking, ultrasonic vibration, or rotating movement. The number of vibrations usually employed is from 0.2 to 1.000 cycles/sec.

What we claim is:

1. A process for producing a bundle of optical fibers aligned in a highly parallel and compact state, which comprises tying a bundle of a number of optical fibers at a small portion in the vicinity of its one end, holding the tied portion and suspending the non-tied substantial portion of the bundle vertically with said substantial portion being exposed to air, applying a liquid pressure to the tied end portion of said bundle to allow liquid to flow through the interspaces among the individual fibers from the tied end to the free end of the bundle, and while substantially the entire length of the fiber bundle remains suspended in air imparting a mechanical vibration to the fiber bundle simultaneously with the application of the liquid pressure, said mechanical vibration being applied to the tied portion of the bundle.

2. A process of claim 1 wherein the pressure of the liquid is 0.5 to 5 kg/cm².

3. A process of claim 1, wherein in the early stage of the process, the liquid pressure and the vibration energy are maintained relatively large, and with the passage of time, they are gradually reduced.

4. An apparatus for aligning the individual fibers of a bundle of optical fibers compactly and in parallel to one another, said apparatus comprising a wall element for defining a closed space; holding means connected to said wall element for holding the outer peripheral portion of the upper end of the downward fiber bundle and suspending the unheld substantial portion of the bundle in the vertical direction, said holding means including an opening for exposure of the upper end face of the fiber bundle, and said wall element, said holding means, and the end face of the fiber bundle exposed from the opening together forming the closed space; means for introducing liquid pressure, said means being connected to said wall element and introducing liquid into the closed space whereby the liquid passes downwardly from the exposed end face through the interspace among the individual optical fibers; and vibrating means for imparting vibration to said fiber bundle during the flowing of the liquid, said vibration means being in contact with said holding means.

5. An apparatus of claim 4, further comprising means for removing liquid which has dropped into the air through the interspaces among the optical fibers.

* * * * *